United States Patent [19]

Carder

[11] 3,966,572
[45] June 29, 1976

[54] PHOTOCURABLE LOW GLOSS COATINGS CONTAINING SILICA AND ACRYLIC ACID

[75] Inventor: Charles H. Carder, Charleston, W. Va.

[73] Assignee: Union Carbide Corporation, New York, N.Y.

[22] Filed: Feb. 11, 1975

[21] Appl. No.: 549,043

[52] U.S. Cl. .............. 204/159.16; 204/159.15; 204/159.23; 204/159.24; 260/42.29; 260/42.52; 260/42.53; 260/47 UA; 260/23 EP; 260/23 CP; 260/23 AR; 260/23.5 R; 260/77.5 CR; 427/54; 428/429; 428/463; 428/514; 526/317; 526/328
[51] Int. Cl.² ............... C08F 8/00; C08F 2/46
[58] Field of Search ............... 204/159.15, 159.16, 204/159.19, 159.23, 159.24; 260/23 EP; 427/54

[56] References Cited
UNITED STATES PATENTS

| | | | |
|---|---|---|---|
| 3,551,235 | 12/1970 | Bassemir et al. | 156/99 |
| 3,912,670 | 10/1975 | Huemmer et al. | 260/23 EP |

*Primary Examiner*—Richard B. Turer
*Attorney, Agent, or Firm*—Francis M. Fazio

[57] ABSTRACT

The addition of a small amount of acrylic acid to a silica-containing radiation curable coating increases the flatting efficiency of the silica.

2 Claims, No Drawings

PHOTOCURABLE LOW GLOSS COATINGS CONTAINING SILICA AND ACRYLIC ACID

BACKGROUND OF THE INVENTION

Increasingly tough restrictions regarding coating effluents allowed to escape into the atmosphere have prompted considerable efforts to develop 100 percent reactive coatings, that is, liquid coating compositions that have no volatile components. In this type of coating, the reactive solvents are monomers that undergo reaction to become incorporated in the cured film. The cure or polymerization of these coatings is conveniently initiated by exposure of the applied coating to electron radiation or to ultraviolet light.

However, some of the coatings developed have had an undesirable high gloss for many applications. To lower the gloss value silica has been used as a flatting agent but in many instances, even a minimal amount of silica has resulted in an undesirable high increase in both the viscosity and thixotropy of the 100 percent solids coating composition. Many attempts have been made to obtain a lower gloss coating but to date this has not been successful without encountering the other undesirable effects.

SUMMARY OF THE INVENTION

It has not been found that the addition of a small amount of acrylic acid to a photocurable coating composition containing silica increases the ability of the silica to produce a lower gloss film. This improvement is generally obtained without any appreciable increase in viscotity or thixotropy. In some instances, however, it has been observed that viscosity is lowered to some degree by the addition of the acrylic acid.

DESCRIPTION OF THE INVENTION

The 100 percent coatings compositions that are useful in this invention are the acrylate-based compositions. These compositions are well known and generally contain one or more of a photocurable acrylate or methacrylate which can be either monofunctional or polyfunctional. Among the acrylyl compounds that can be used in producing the coating compositions, one can mention, acrylic acid, acrylamide, methyl acrylate, ethyl acrylate, hexyl acrylate, 2-ethylnexyl acrylate, butoxyethoxyethyl acrylate, neopentyl glycol diacrylate, bicyclo [2.2.1]hept-2-yl acrylate, dicyclopentenyl acrylate, pentaerythritol mono- or di- or triacrylate or mixtures thereof, isodecyl acrylate, trimetnylolpropane mono- or di- or triacrylate or mixtures thereof, 2-phenoxyethyl acrylate, glycidyl acrylate, 2-ethoxyethyl acrylate, 2-methoxyethyl acrylate, 2-(N,N-diethylamino)ethyl acrylate, omega-methoxyethyl(hendecaoxyethylene) acrylate, omega-tridecoxyethyl(hendecaoxyethylene) acrylate, trimethoxyallyloxymethyl acrylate, bicyclo [2.2.1]hept-2-en-5-ylmethyl acrylate, ethylene glycol diacrylate, bicyclo [2.2.1]hept-2-en-5,6-diyl diacrylate, vinyl acrylate, 2-hydroxypropyl acrylate, 2-hydroxyethyl acrylate, acrylated epoxidized soybean oil, acrylated epoxidized linseed oil, (methyl carbamyl) ethyl acrylate, the reaction product of an aromatic or aliphatic polyisocyanate (such as tolylene diisocyanate) with a hydroxyalkyl acrylate (such as 2-hydroxyethyl acrylate or 2-hydroxypropyl acrylate). The acrylyl compounds are well-known and the above discussion is only illustrative; any photocurable compound containing the acrylyl group is suitable for use.

In addition, the coating compositions are known to be capable of containing a small amount of other polymerizable materials containing the ethylenically unsaturated group of the structure $>C=C<$.

The coating compositions will also contain a photosensitizer, activator, catalyst or initiator, they can be used individually or in combination, with the total amount varying from 0.01 to 20 percent by weight of the photocurable composition. A preferred amount is from 0.1 to 5 percent by weight, with an amount of from 0.5 to 2 percent by weight most preferred. With some combinations one may observe a synergistic effect. These additives and the use thereof are well known in the art and do not require extensive discussions; therefore, only a limited number will be referred to, it being understood that any compound possessing the ability to function in such manner can be used. As suitable photosensitizers one can mention acctophenone, propiophenone, benzophenone, xanthone, thioxanthone, fluorenone benzaldehyde, fluorene, anthraquinone, triphenylamine, carbazole, 2- or 3- or 4- methylacctophenone, 2- or 3- or 4- methoxyacetophenone, 2- or 3- or 4-bromoacetophenone, 3- or 4- allylacetophenone, m- or p-diacetylbenzene, 2- or 3- or 4-methoxybenzophenone, 3,3'- or 3,4'- or 4,4'-dimethoxybenzophenone, 4-chloro-4'-benzylbenzophenone, 2- or 3- chloroxanthone, 3,9-dichloroxanthone, 2- or 3-chlorothioxanthone, 3-chloro-8-nonylxanthone, 3-methoxyxanthone, 3-iodoxanthone, 2-acetyl-4-methylphenyl acetate, benzoin, alkyl, and aryl ethers of benzoin, the phenylglyoxal alkyl acetals, 2,2'-dimethoxy-2-phenylacetophenone, 2,2-diethoxyacetophenone, 2,2-diisopropoxyacetophenone, 1,3-diphenyl acetone, naphthalene sulfonyl chloride, toluene sulfonyl chloride. As suitable activators that can be used in conjunction with the photosensitizers one can mention the organic amines such as methylamine, decylamine, diisopropylamine, tributylamine, tri-2-chloroethylamine, ethanolamine, triethanolamine, methyldiethanolamine, 2-aminoethylethanolamine, allylamine, cyclohexylamine, cyclopentadienylamine, diphenylamine, ditolylamine, trixylylamine, tribenzylamine, N-cyclohexylethyleneimine, piperidine, 2-methylpiperidine, N-ethylpiperidine, 1,2,3,4-tetrahydropyridine, 2- or 3- or 4-picoline, morpholine, N-methylmorpholine, piperazine, N-methylpiperazine, 2,2-dimethyl-1,3-bis-[3-(N-morpholinyl)propionyloxy]-propane, 1,5-bis[3-(N-morpholinyl)propionyloxy]diethyl ether. As suitable catalysts and initiators one can mention the diaryl peroxides, the hydroperoxides, the peracids and peresters, the azo compounds, or any other known free radical initiator or catalyst, such as di-t-butyl peroxide, benzoyl peroxide, 2,4-dichlorobenzoyl peroxide, t-butyl hydroperoxide, peroxyacetic acid, peroxybenzoic acid, t-butyl peroxypivalate, t-butyl peracetate, azobisisobutyronitrile.

The coating compositions containing the above are well known and the amount of any particular component in the composition can be varied at the desire of the individual. Those skilled in the art are fully familiar with these compositions and the manner in which they are produced.

As indicated, this invention is concerned with the improvement in flatting efficiency of the silica to obtain a low gloss film. The particular silica that is used does have some effect and it has been found that all those which have been evaluated are affected by the addition of acrylic acid thereto. The silica is present in the coating composition in the conventional amounts normally used in radiation-curable systems, which are from 1 to 25 weight percent based on the composition.

The amount of acrylic acid added to the 100 percent solids coating composition is from about 0.1 to 10 weight percent, preferably 1 to 5 weight percent. It was found that acrylic acid is for all intents and purposes, unique in this respect, since experiments with methacrylic acid and acetic acid did not produce the same desirable effect.

The coating compositions of this invention are prepared, applied, and cured by methods known to those skilled in the art and such procedures do not require further elaboration herein. The following examples further serve to illustrate the invention. In these examples the physical and chemical tests were run on the cured films as described in Physical and Chemical Examination of Paints, Varnishes, Lacquers, and Colors, 11th edition, Gardner Laboratory, Bethesda, Md., 1950.

Abrasion Resistance 0 Test was run for 200 cycles, reported as milligrams of coating removed per hundred cycles with CS-17 wheels bearing 1,000 gram weights. pp. 181–3.

Sward Hardness — compared to glass at 100. pp. 164–6.

Impact Resistance — falling tube impact device, described on pp. 173–5.

The adhesion was measured by noting the percentage of film remaining after a tape pull (Scotch No. 610) on a grid of razor blade cuts, 10 in each direction, ⅛ inch apart.

Resistance to stains was measured by placing drops of the staining liquid on the coated panel, then covering the liquid with a small inverted dish or bottle cap. After the designated period, the liquid was wiped away with a wet towel and the imparted stain was rated on a scale of 1–10 with 10 representing no stain and 1 designating very severe staining.

Acetone resistance, a measure of through-cure, was determined by placing a small swatch of cotton or absorbent paper towel saturated with acetone on the cured film, then measuring the time required in seconds for the film to be lifted off the substrate. During the test the cotton or towel was kept saturated with acetone by the addition of small amounts via a dropper.

EXAMPLE 1

A series of formulations were prepared as follows:

|  | Parts by Weight | | |
| --- | --- | --- | --- |
|  | Control | A | B |
| Acrylated urethane adduct | 26.7 | 26.7 | 26.7 |
| 2-Phenoxyethyl acrylate | 15.3 | 15.3 | 15.3 |
| Neopentyl glycol diacrylate | 18.0 | 18.0 | 18.0 |
| Acrylic Acid | — | 1.2 | 3.0 |
| n-Butyl ether of benzoin | 1.2 | 1.2 | 1.2 |

The acrylated urethane adduct used was produced by adding 98 grams of phenoxyethyl acrylate, 410 grams trimethylhexamethylene dissocyanate, and 1 gram of dibutyltin dilaurate to a flask. This mixture was heated to 40°C, and over a period of about 2 hours 473 grams of 2-hydroxyethyl acrylate was added at a temperature of from 40° to 45°C. The mixture was then heated for an additional hour, cooled and transferred to a container until used. The control and formulations A and B had added to each of them 10 weight percent of 2 different silica flatting agents. In the first series the flatting agent used was Syloid 74. In the second series the flatting agent used was Syloid 308. The flatting agent was dispersed in the formulation by stirring for 60 seconds with a high speed stirrer.

Films were applied with a No. 20 wire wound rod to sanded birch panels and cured by exposure to radiation from 2.2 kw. mercury lamps under nitrogen by exposure for 1.8 seconds. The panels were sanded and a second top coat of the same material was applied and cured in the same fashion. The properties of the cured films are set forth below and compared with those of the control for each series produced.

| First Series | Control | A | B |
| --- | --- | --- | --- |
| 60° Gardner Gloss* | 77–81 | 56–60 | 46–65 |
| Sward Hardness | 28 | 34 | 28 |
| Crosshatch Adhesion (%) | 30 | 60 | 75 |
| Taber wear factor | 8.6 | 5.7 | 8.6 |
| Resistance to |  |  |  |
| nail polish remover | 10 | 10 | 10 |
| black ink | 10 | 10 | 10 |
| 3% ammonia | 10 | 10 | 10 |
| mercurochrome | 10 | 10 | 10 |
| bleach | 10 | 10 | 10 |

*One measurement was taken in the direction of the drawdown (usually higher), and the second taken in the opposite direction.

| Second Series | Control | A | B |
| --- | --- | --- | --- |
| 60 Gardner Gloss | 40–50 | 34–35 | 40–42 |
| Sward Hardness | 38 | 34 | 32 |
| Crosshatch Adhesion (%) | 0 | 0 | 75 |
| Taber wear factor | 11.6 | 17.2 | 7.5 |
| Resistance to |  |  |  |
| nail polish remover | 10 | 10 | 10 |
| black ink | 10 | 10 | 10 |
| 3% ammonia | 10 | 10 | 10 |
| mercurochrome | 10 | 10 | 9 |
| bleach | 10 | 10 | 10 |

The lower gloss values of the compositions of this invention are clearly shown.

EXAMPLE 2

Using the same procedure described in Example 1, a coating composition was prepared, applied and cured. The formulation in this instance was as follows:

|  | Control | A |
| --- | --- | --- |
| Acrylated epoxidized soybean oil | 24.0 | 24.0 |
| 2-Phenoxyethyl acrylate | 12.0 | 12.0 |
| Neopentyl glycol diacrylate | 24.0 | 24.0 |
| Acrylic Acid | — | 3.0 |
| n-Butyl ether of benzoin | 1.2 | 1.2 |

From each formulation two series were produced containing 10 weight percent Syloid 74 in the first series and 10 weight percent of Syloid 308 in the second series. The results set forth below show the lower gloss values obtained using formulation A which contained the acrylic acid as compared to the control formulation.

|  | First Series | | Second Series | |
| --- | --- | --- | --- | --- |
|  | Control | A | Control | A |
| Sward Hardness | 28 | 24 | 30 | 26 |
| Crosshatch Adhesion (%) | 70 | 95 | 70 | 75 |
| Taber wear factor | 10.1 | 8.6 | 13.8 | 13.3 |
| Resistance to |  |  |  |  |

|  | -continued | | | |
|---|---|---|---|---|
|  | First Series | | Second Series | |
|  | Control | A | Control | A |
| nail polish remover | 10 | 10 | 10 | 10 |
| black ink | 10 | 10 | 10 | 10 |
| 3% ammonia | 10 | 10 | 10 | 10 |
| mercurochrome | 10 | 10 | 10 | 10 |
| bleach | 10 | 10 | 10 | 10 |
| 60° Gardner Gloss | 61–70 | 37 | 88 | 41–43 |

EXAMPLE 3

A composition was produced containing 892 parts of the acrylated urethane adduct described in Example 1, 508 parts of 2-phenoxyethyl acrylate, 60 parts of neopentyl glycol diacrylate and 4 parts of n-butyl ether of benzoin.

Three separate 10 gram portions were removed and each portion was modified as follows:
  Portion A — added 0.15 gram of acrylic acid and 1.3 grams of Syloid 308
  Portion B — added 0.25 gram of acrylic acid and 1.3 grams of Syloid 308
  Portion C — control, added 1.3 grams of Syloid 308
These coatings were applied and cured as described in Example 1 except that only one coat was applied and the substrate was a steel panel. 60° Gardner Gloss values for these three coatings were as follows:

| Portion | A | B | C |
|---|---|---|---|
| Direction of Drawdown | 69 | 72 | 91 |
| Against Direction of Drawdown | 66 | 74 | 90 |

The decrease in gloss by the addition of acrylic acid to the coating composition is clearly apparent from these values. When methacrylic acid was added at concentrations of 0.15 or 0.25 grams a slight decrease in gloss was observed. With the addition of 1.5 grams of acetic acid there was essentially no noticeable decrease in the gloss value.

EXAMPLE 4

A photocurable coating composition was prepared by mixing 35 parts 2-phenoxyethyl acrylate, 30 parts pentaerythritol acrylate, 35 parts acrylated expoxidized soybean oil and 2 parts n-butyl ether of benzoin. Ten-gram aliquots of the coating were then weighed into bottles, and treated as shown to produce two formulations in accord with this invention and two controls.

|  | Control | A | Control | B |
|---|---|---|---|---|
| Coating | 10 | 10 | 10 | 10 |
| Acrylic Acid | — | 0.2 | — | 0.5 |
| Syloid 74 | 2 | 2 | — | — |

|  | Control | A | Control | B |
|---|---|---|---|---|
| Syloid 308 | — | — | 2 | 2 |

These formulations were coated on to steel panels as described in Example 3 and cured using a argon plasma arc radiation system delivering 5.65 kw/ft$^2$ of light intensity as described in U.S. Pat. No. 3,650,669. Exposure time was 0.6 second. The sward hardness and Gardner Gloss values are set forth below and it is seen that the compositions of this invention have the desired lower gloss.

|  | Control | A | Control | B |
|---|---|---|---|---|
| Sward Hardness | 20 | 22 | 26 | 24 |
| 60° Gardner Gloss |  |  |  |  |
| (with drawdown) | 51 | 45 | 61 | 47 |
| (against drawdown) | 51 | 41 | 62 | 46 |

EXAMPLE 5

A coating composition was produced by mixing 44 parts of the acrylated urethane adduct described in Example 1, 36 parts of 2-phenoxyethyl acrylate, 20 parts neopentyl glycol diacrylate and 2 parts n-butyl ether of benzoin. Ten-gram aliquots were then weighed into bottles and treated as shown to produce two formulas (A and B) in accord with this invention and two controls.

|  | Control | A | Control | B |
|---|---|---|---|---|
| Coating | 10 | 10 | 10 | 10 |
| Acrylic Acid | — | 0.2 | 0.3 | 0.5 |
| Syloid 74 | 2 | 2 | 2 | 2 |

The resulting mixtures were dispersed, applied, cured as described in Example 4, and gave cured films with the following properties:

|  | Control | A | Control | B |
|---|---|---|---|---|
| Sward Hardness | 34 | 40 | 38 | 30 |
| 60° Gardner Gloss |  |  |  |  |
| (with drawdown) | 45 | 42 | 38 | 38 |
| (against drawdown) | 43 | 41 | 36 | 36 |

What is claimed is:
1. In a photocurable acrylate-based coating or ink composition containing silica as the flatting agent, the improvement of having present in said composition from 0.1 to 10 weight percent of acrylic acid, based on the weight of the composition.
2. A photocurable composition as claimed in claim 1 wherein the acrylic acid content is from 1 to 5 weight percent.

* * * * *